UNITED STATES PATENT OFFICE.

LEONARD WICKENDEN, OF FLUSHING, NEW YORK, ASSIGNOR TO INDUSTRIAL CHEMICAL COMPANY, OF NEW YORK, N. Y., A CORPORATION OF NEW YORK.

ACID-RESISTING PAINT OR VARNISH COMPOSITION, &c.

1,398,084.   Specification of Letters Patent.   Patented Nov. 22, 1921.

No Drawing.   Application filed July 12, 1919.   Serial No. 310,412.

*To all whom it may concern:*

Be it known that I, LEONARD WICKENDEN, a subject of the King of Great Britain, and resident of Flushing, county of Queens, State of New York, have made a certain new and useful Invention Relating to Acid-Resisting Paint or Varnish Compositions, &c., of which the following is a specification.

This invention relates especially to paint or varnish compositions of an acid resisting or acid proof character, such as can be successfully used in the presence of chlorin or hydrochloric acid material. For this purpose chlorinated hydrocarbon bodies may be advantageously used and a suitable material may be prepared by quite thoroughly chlorinating such high melting point hydrocarbon waxes as petroleum asphaltum waste which is produced in large quantities as a by-product in petroleum refining and may be secured in various qualities having melting points of some eighty to one hundred and thirty degrees centigrade. It is usually desirable to incorporate with such chlorinated bodies a suitable softening or toughening agent such as chlorinated vegetable or animal oils or the like, chlorinated cotton seed oil giving good results. These softening agents may be used in suitable proportions such as ten to twenty per cent. more or less, depending on the character of the other chlorinated hydrocarbon which forms the body or base material. This is of course dependent to some extent on the particular service for which this material is intended.

A suitable material for use in this connection can be secured in considerable quantities from oil refineries which produce and sell the same under the name of petroleum asphaltum, pitch or bitumen. This material is produced as a still residue in refining some grades of petroleum and is usually blown with air or oxygenated before being put on the market. Such hydrocarbon bodies are usually substantially saturated from the chemical standpoint and are somewhat sticky, tarry materials which can be secured in various grades corresponding to melting points of eighty to one hundred and thirty degrees centigrade more or less. The medium grade of material having melting points of one hundred degrees to one hundred and twenty degrees centigrade or so gives good results preferably when substantially completely chlorinated and combined and dissolved in the general manner described.

This material may be conveniently chlorinated in various ways and for instance the material may be subjected to chlorin percolation after being dissolved in a suitable solvent which gives a more uniform reaction and enables the chlorination to be regulated in a desirable way. Carbon tetrachlorid may be used for this chlorinating solvent and the petroleum asphaltum or bitumen may be dissolved therein in considerable quantities, together with the desired proportions of the softening or toughening agents which may be used in some cases. The percolation of chlorin gas through such solutions effects the chlorination of the hydrocarbons present and this exothermic reaction may be controlled by cooling or stirring so as to proceed in a regulated manner. It is desirable where the material is to be used in connection with chlorin especially of a more or less nascent character that the chlorination be carried to substantial completion which may be determined by suitable tests or by the extent to which the chlorine is given off during the percolating operation.

An illustrative composition for this purpose may be made by incorporating ten to twenty per cent. of ordinary cotton seed oil with petroleum asphaltum having a melting point of, say, one hundred and twenty degrees centigrade and dissolving these materials before or after combining or mixing them together in carbon-tetrachlorid which may be efficiently used to dissolve some fifty per cent. or so of these materials. Then after substantially completing chlorinating these hydrocarbon bodies as described the carbon-tetrachlorid may be recovered for further use by various distillation or fractionation methods, although it is usually desirable to incorporate the paint or varnish solvent with the chlorinated bodies before the carbon-tetrachlorid is completely eliminated. For this purpose the paint or varnish solvents used may be incorporated in the dissolved chlorinated base material by stirring or agitating methods at a suitable rise of temperature to secure thorough incorporation and then fractional distillation methods may be used to eliminate the carbon-tetrachlorid, especially if relatively high boiling point solvents have been incorporated for use in the final product. Any suitable solvents may be used in this connection and good results can be secured by using as the paint or varnish solvents turpentine, kerosene, texene or heavy acetone oils which may be secured at relatively low cost if they have boiling points of over two hundred degrees centigrade. An illustrative solvent composition for such material when prepared and used for chlorin resisting paint may comprise such high boiling point acetone oils to the extent of fifty to seventy-five per cent. incorporated with light kerosene or turpentine or mixtures thereof.

An illustrative composition of highly resistant character may comprise a chlorinated base material formed of petroleum asphaltum having a melting point of one hundred and ten to one hundred and twenty degrees centigrade combined with ten to fifteen per cent of cotton seed oil and quite thoroughly chlorinated. This may be dissolved in a suitable solvent depending on the particular service desired and to produce a thick paint or varnish this chlorinated base material may be dissolved in high boiling point acetone oils so as to form a uniform solution containing thirty to fifty per cent. or so of the chlorinated base material. This paint or varnish composition with or without various fillers, etc., may be used as a protective coating on iron steel or other metals and materials. The composition is especially effective when applied as by spraying, dipping or brushing to concrete, carbon or other bodies which are to be protected in electrolytic cell work; and by applying a sufficiently thick coating complete electric insulation and protection of the material may be secured. Also, by using a thin coating on carbon or graphite electrodes, for instance, a desirable protection may be secured against internal erosion or excessive wasting away of the material without completely preventing or undesirably affecting the electric conduction or operation of the elements. For this purpose a relatively thinly fluent solution of such chlorinated hydrocarbon material may be dissolved in any suitable volatile solvent therefor and the carbon electrodes immersed therein for a number of hours or days until the solution has permeated the electrode after which the treated electrode may be drained and dried which seems to leave a very thin and perhaps discontinuous coating over the porous material which is still sufficiently conductive for electrolytic cell work while very materially protected against surface wasting or internal erosion by chlorin. If desired, however, a thinly fluent protective solution or composition of this character may be applied to the surfaces of the electrode and allowed to permeate or penetrate the carbonaceous material to the desired extent and form a similarly thin penetrable coating over the outer porous portions of the electrode.

This invention has been described in connection with a number of illustrative materials, proportions, conditions and nature and order of steps and methods of preparation and use, to the details of which disclosure the invention is not of course to be limited, since what is claimed as new and what is desired to be secured by Letters Patent is set forth in the appended claims:

1. The paint or varnish composition comprising chlorinated base material including eighty to ninety per cent. of substantially completely chlorinated high melting point petroleum asphaltum and incorporated chlorinated oil dissolved in high boiling point volatile solvent containing acetone oils.

2. The paint or varnish composition comprising chlorinated base material including at least eighty per cent. of substantially completely chlorinated high melting point petroleum asphaltum and incorporated chlorinated oil dissolved in high boiling point volatile solvent.

3. The paint or varnish composition comprising dissolved chlorinated base material including over eighty per cent. chlorinated high melting point petroleum asphaltum and incorporated chlorinated oily hydrocarbon material.

4. The paint or varnish composition comprising substantially completely chlorinated base material including chlorinated petroleum asphaltum and incorporated chlorinated hydrocarbon material dissolved in volatile solvent therefor.

5. The chlorin resisting paint or varnish composition adapted for use in chlorin electrolytic cells or the like and comprising chlorinated base material including eighty to ninety per cent. of substantially completely chlorinated high melting point petroleum asphaltum and incorporated chlorinated hydrocarbons dissolved in volatile solvent.

LEONARD WICKENDEN.